Figure 1:
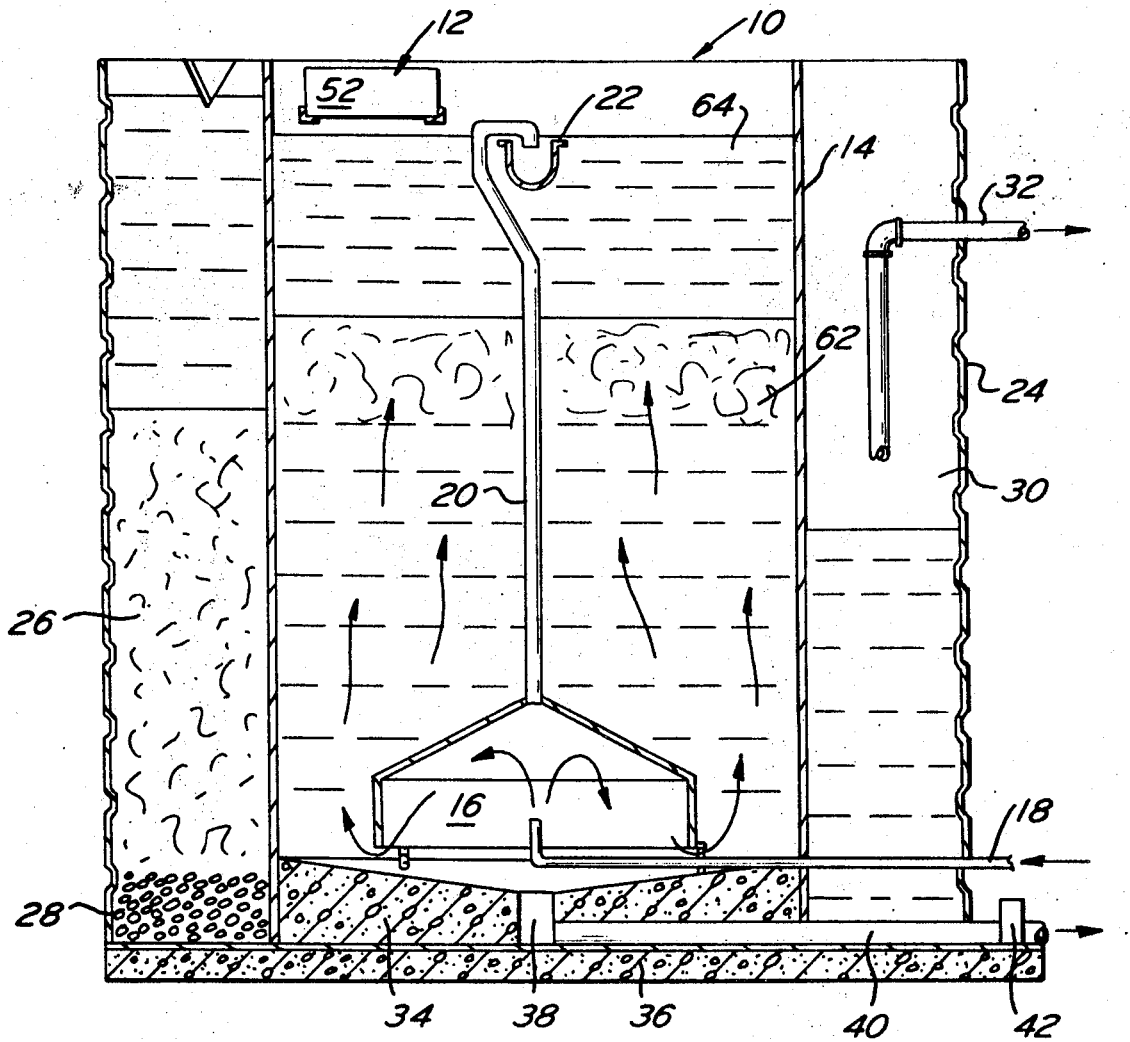

United States Patent

[11] 3,608,723

| [72] | Inventor | David Brown |
| | | Lansdale, Pa. |
| [21] | Appl. No. | 783,171 |
| [22] | Filed | Dec. 5, 1968 |
| [45] | Patented | Sept. 28, 1971 |
| [73] | Assignee | Met-Pro Water Treatment Corp. |
| | | Lansdale, Pa. |

[54] FLOC BLANKET LEVEL CONTROLLER COMPRISING MEANS FOR SENSING LIGHT DIFFUSELY REFLECTED FROM THE FLOC BLANKET
6 Claims, 3 Drawing Figs.

[52] U.S. Cl. .................................................. 210/114, 250/218
[51] Int. Cl. .................................................. C02c 1/20, B01d 21/24, G01n 21/26
[50] Field of Search.......................................... 250/218; 315/93; 356/210, 1, 156; 210/125, 97, 114, 115; 73/293

[56] References Cited
UNITED STATES PATENTS

| 1,991,192 | 2/1935 | Bucky | 356/156 X |
| 2,315,282 | 3/1943 | Snow | 356/210 |
| 2,365,293 | 12/1944 | Robinson | 210/125 |
| 2,586,375 | 2/1952 | Pennow | 315/93 |
| 2,592,165 | 4/1952 | McDermott | 315/93 |
| 2,503,770 | 4/1950 | Robinson | 250/218 |
| 2,588,672 | 3/1952 | Turvey | 250/218 |
| 2,764,178 | 9/1956 | Paul et al. | 250/218 |
| 3,404,282 | 10/1968 | Walker | 250/218 |

FOREIGN PATENTS

| 179,330 | 2/1921 | Great Britain | 356/1 |

Primary Examiner—James W. Lawrence
Assistant Examiner—T. N. Grigsby
Attorney—Seidel, Gonda & Goldhammer ABSTRACT: A sensor based on light reflectance is disclosed for detecting when a hydraulically suspended interface, such as a floc blanket in an upflow clarifier, has reached a predetermined level at which point a control valve(s) is operated to lower the floc blanket level by automatically directing that a predetermined quantity of the solids/liquid slurry be removed from the system.

INVENTOR
DAVID BROWN

BY Seidel & Gonda
ATTORNEYS.

FLOC BLANKET LEVEL CONTROLLER COMPRISING MEANS FOR SENSING LIGHT DIFFUSELY REFLECTED FROM THE FLOC BLANKET

This invention relates to a suspended interface sensor, and more particularly, to a sensor for detecting that a suspended interface such as a flock blanket in a water, waste water or product clarifier has reached a predetermined level. In an upflow clarifier, liquid which has previously been dosed with chemicals is passed upwardly through a sedimentation area. Here the sedimentation process permits a layer of clear fluid to form above the suspended solids or floc blanket. This suspended slurry of solids, known as a floc blanket, aids in the removal of suspended solids, inorganic materials, and certain organic material, etc., depending upon the chemicals employed and their dosage used in the incoming fluid.

A typical upflow clarifier is shown in U.S. Pat. No. 2,365,293. The floc blanket therein is identified as an accumulation of slurry which forms a hydraulically suspended slurry or floc blanket. The floc blanket is caused to form by introducing into the fluid to be treated a variety of chemicals or minerals, singularly or in combination, and causing this mixture to be hydraulically separated in an upflow clarifier. It is essential in such equipment that the height of the floc blanket be controlled so that it does not upset or overflow the clarifier and be carried into other process steps or the fluid product.

The sensor of the present invention is not affected by the previously mentioned layer of clarified fluid, which forms above the floc blanket, but operates therethrough to prevent the floc blanket from rising beyond a predetermined level. This is accomplished by means of a sensor based on light reflectance.

The sensor includes a lamp for directing a light beam into the fluid downwardly toward the floc blanket. The light beam, at an acute angle with respect to a vertical line, passes through the clear fluid above the floc blanket and is reflected off the upper surface of the floc blanket. The sensor includes a reflectance photocell directed downwardly along said line. Reflectance is possible as the floc blanket is sufficiently dense and opaque. At a predetermined level the reflectance spot of the light beam reflects along a line perpendicular to the floc blanket and into the face of the photocell, triggering the control network. Should the light source burn out, a switching circuit energizes a second lamp, in parallel with the first, to take over the emission of a light beam. The reflected light causes the photocell's resistance to change allowing a signal to be fed through a potentiometer controlled amplifier. The amplified signal is utilized to control a solenoid which in turn actuates a control pump or valve on the sludge or drain line of the clarifier. When the pump or valve is actuated, a portion of the clarifier's contents are drawn off. The valve is preferably closed under the influence of a timer and control network whereby the clarifying process may be continued.

By using a circuit which contains elements such as a variable input impedance amplifier, the amplifier may be adjusted in a manner whereby it is insensitive to reflection of the light beam off the upper surface of the clarified fluid. Conventional liquid level controls which make physical contact with the floc blanket are impractical in this application since the floc blanket is physically sticky and frequently scale forming, therefore requiring frequent cleaning.

It is an object of the present invention to provide a novel suspended interface sensor based on light reflectance from the surface of the interface level.

It is another object of the present invention to provide a sensor for controlling the upper level of a floc blanket having a layer of clarified fluid thereabove without making contact with a portion of the floc blanket.

It is another object of the present invention to provide a sensor for controlling the upper level of a floc blanket in an upflow clarifier so that the floc blanket does not rise above a predetermined level by means of a sensor which is responsive to reflectance of light from the upper surface of the floc blanket.

It is another object of the present invention to provide a sensor for controlling the upper level of a floc blanket in an upflow clarifier in a manner which is simple, economical, and reliable.

Objects will appear hereinafter.

Figure 2:
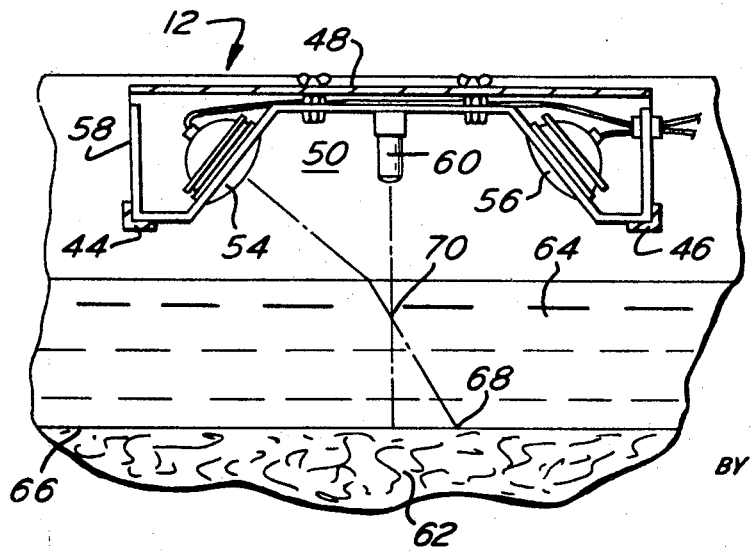

For the purpose of illustrating the invention, there is shown in the drawings a form which is presently preferred; it being understood, however, that this invention is not limited to the precise arrangements and instrumentalities shown. FIG. 1 is a sectional view in elevation of an upflow clarifier utilizing the sensor of the present invention. FIG. 2 is an enlarged detail view of the sensor, partly in section.

Figure 3:
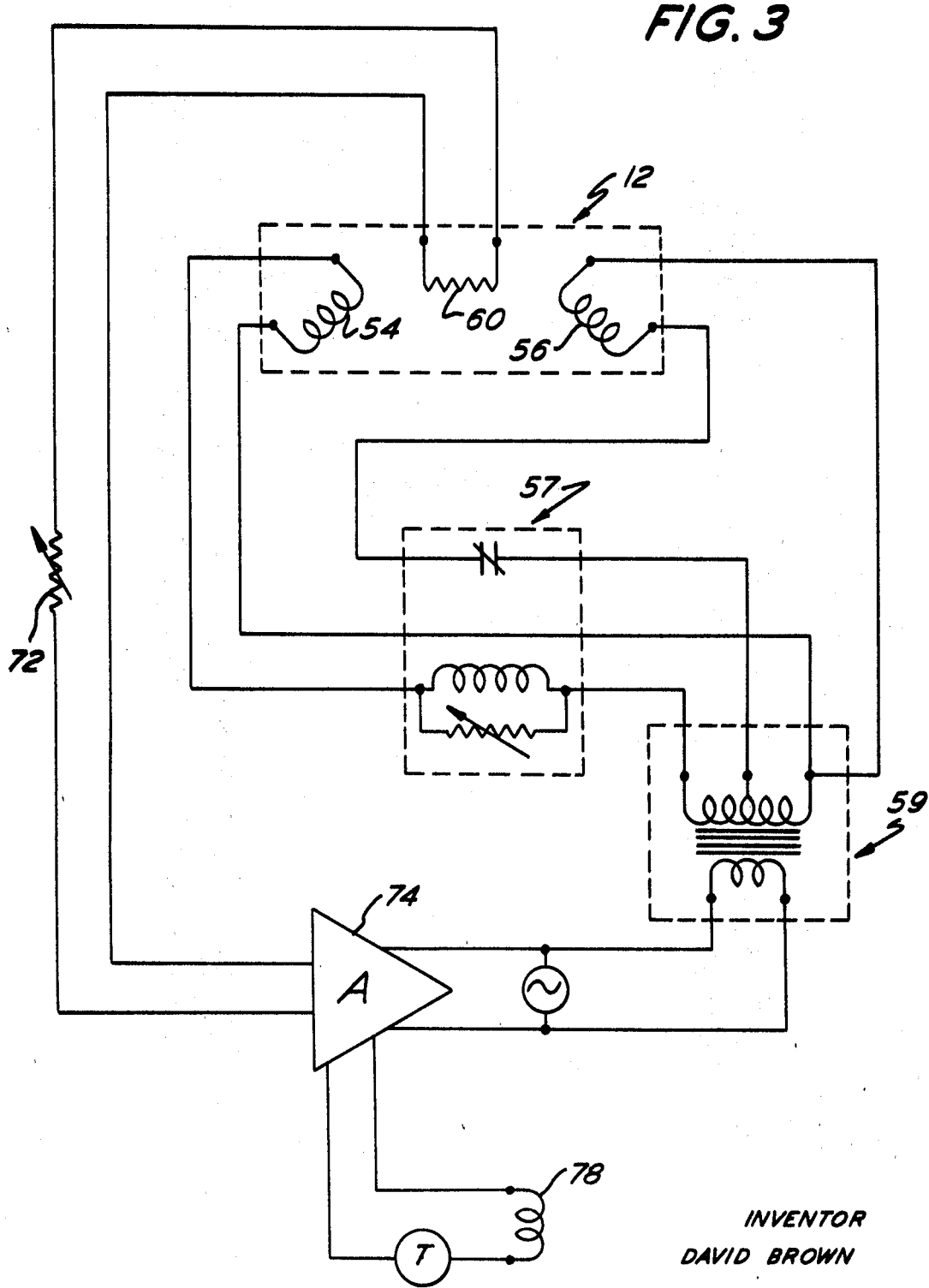

FIG. 3 is a schematic diagram of electrical circuitry.

Referring to the drawing in detail, wherein like numerals indicate like elements, there is shown in FIG. 1 water-treating apparatus designated generally as 10 and including the sensor of the present invention designated generally as 12.

The apparatus 10 includes an upflow clarifier 14 which is preferably cylindrical in cross section. The clarifier 14 includes an inverted cone 16 adjacent its bottom. Water to be treated is introduced into the cone 16 by way of an inlet conduit 18. The cone is vented to atmosphere by way of a vent pipe 20. Clarified water exits from the clarifier 14 by overflowing a weir-trough 22 at the upper end of the clarifier.

A tank 24 surrounds the clarifier 14. The space between the clarifier 14 and tank 24 is divided by partitions, not shown, into arcuate chambers. The weir-trough 22 feeds the clarified water into chamber 26 where it passes downwardly through a filter bed 28, and is then pumped upwardly through another filter bed, not shown, until it eventually overflows into the holding chamber 30. From chamber 30, the water may be removed for reuse by way of conduit 32.

Beneath the cone 16 in the clarifier 14, there is provided a concrete bottom wall 34 having a central passage 38. The clarifier 14 and the tank 24 are mounted on a common base 36. A drain conduit 40 communicates with passage 38 and contains an electrically operated valve 42.

As shown more clearly in FIG. 2, the sensor 12 is supported in and by the clarifier 14 on structural members 44 and 46. The sensor 12 includes a housing having a top wall 48 and sidewalls 50 and 52. The housing lacks end walls and lacks a bottom wall.

A pair of lamps 54 and 56 are supported by a bracket 58 within the sensor housing. Only one of the lamps 54 and 56 is utilized at any given time, the other being a spare. Each of the lamps is adapted to project a light beam at an acute angle with respect to a vertical line. The vertical line coincides with the longitudinal axis of a reflectance photocell 60 which projects downwardly into the clarifier 14.

Chemicals are introduced into the water to be treated before the water is introduced through inlet conduit 18 into the clarifier 14. The chemicals and the materials being removed from the water form the floc blanket 62, which is continuous down to the base 34. The water to be treated passes upwardly through the floc blanket 62 and forms a layer of clarified water 64 which may then overflow the weir-trough 22. The interface between the floc blanket 62 and the layer of clarified water 64 is designated as 66. See FIG. 2.

Circuitry is schematically shown in FIG. 3. The circuitry includes a valve control circuit comprising the cell 60 in series with an adjustable potentiometer 72 and coupled through an amplifier 74 to the source. Potentiometer 72 controls amplifier 74 so that a varying amount of reflectance can be amplified and adjusted such that the output of amplifier 74 is controlled and related to the amount of reflected light received by cell 60. The amplified signal operates a coil 78 for controlling valve 42. Coil 78 is controlled by a timer T.

The circuitry also includes a circuit for lamp 54. Lamp 54 is coupled to the source through a multitap transformer 59 and a lamp-switching relay 57. Lamp 56 is likewise coupled to the source through transformer 59 and relay 57. The coil in relay 57 maintains the switch open so that lamp 56 is normally inactive. If lamp 54 burns out, the relay 57 will switch in lamp 56.

In operation, the continued introduction of chemicals to form the floc blanket 62 increases the height of the floc blanket 62. When the floc blanket is at the height illustrated in FIG. 2, the light beam from lamp 54 is reflected to some extent off the upper surface of the layer of clarified water 64 but continues to pass through that layer until it is reflected off the floc blanket 62 at spot 68. As the level of the floc blanket 62 continues to rise, eventually it will reach a level wherein the reflectance spot of the light beam on the upper surface of the floc blanket will be at point 70. When this occurs, the reflectance at spot 70 is sufficient to trigger the photocell 60. The amount of reflectance needed to trigger cell 60 may be adjusted by the potentiometers 72 before the signal is amplified by amplifier 74.

When valve 42 is operated by coil 78, the contents of the clarifier 14 are drained through passage 38 and conduit 40. After valve 42 has been opened for a period of time (such as 1 minute), the valve will be closed by timer T. Water to be treated and additional chemicals are continuously introduced through conduit 18 at a rate which is substantially less than the drainage rate. Conduit 40 may discharge to a separating tank wherein the suspended solids material may be separated from the water. As a result of the drainage, the level of the floc blanket has been lowered to a point whereby the spot where the light beam reflects off the floc blanket is no longer in a position wherein it may activate the cell 60. When the system is first installed, it is necessary to adjust the potentiometer 72 to be certain that the cell 60 is triggered at the right elevation of the floc blanket. Such adjustment is generally necessary because the ambient lighting conditions vary from installation to installation and such ambient lighting conditions have an effect on the cell 60. When initially starting operations, there may be a scum on the upper surface of the clarified water. In that event, the cell 60 can be maintained inactive by opening a switch in its control circuit until after the scum has cleared.

As used hereinafter, the floc blanket may be referred to broadly as a liquid since it has the attributes of a liquid. While the present invention has been described in connection with the sludge interface of an upflow clarifier, it would be appreciated that he sensor of the present invention may be utilized in other systems wherein it is desired to detect the level of a liquid and control the liquid level in the vessel when the reflectance of light at the predetermined liquid level triggers the cell. When the cell 60 is triggered, a valve may be opened or a pump started to drain the contents of the vessel or introduce other liquids into the vessel.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus comprising a vessel including an upflow clarifier having an inverted cone adjacent its lower end, means for introducing a liquid into said cone, means for detecting the interface between the floc blanket and a clarified liquid thereabove, said means including a sensor for directing a light beam downwardly toward the suspended solids interface of the floc blanket and liquid, said light beam being at an acute angle with respect to an upright axis, said sensor including a reflectance photocell directed downwardly along said axis, and a circuit coupled to said cell for controlling the elevation of the interface level when the reflectance of light from said beam on said interface activates said cell to trigger circuitry connected to said cell, and means supporting said sensor adjacent the upper end of said vessel.

2. Apparatus in accordance with claim 1 wherein said circuit includes a potentiometer controlled amplifier whereby a varying amount of reflectance can be amplified and adjusted each that the amplifier output function is controlled and related to the amounted of reflected light received by the photocell.

3. Apparatus in accordance with claim 1 wherein said axis is vertical, and said light beam being directed along a line which is at an angle of approximately 45° with respect to said vertical axis.

4. Apparatus in accordance with claim 1 wherein the vessel is an open-top upflow clarifier, and means for draining the clarifier through the bottom thereof by way of a conduit containing a normally closed solenoid operated valve, said solenoid operated valve being coupled to said circuitry for permitting flow through the conduit when the circuitry is triggered so that the contents of the clarifier may be drained and thereby lower the level of the interface.

5. Apparatus in accordance with claim 1 wherein said introducing means is an inlet conduit, said clarifier having a drain conduit whose capacity is greater than the capacity of the inlet conduit, a valve controlling flow through the drain conduit, said valve being responsive to said circuitry so that it opens when the level of the floc blanket activates said cell.

6. Apparatus in accordance with claim 1 including a pair of lamps alternately operable, and said circuitry including relay means for switching the formerly inactive lamp to an operable condition when the operable lamp is rendered inoperative.